United States Patent [19]
Meeks

[11] Patent Number: 5,984,606
[45] Date of Patent: Nov. 16, 1999

[54] HAY LOADER

[76] Inventor: Kenneth Meeks, 2963 Quay Rd. #66, Tucuncari, N.Mex. 88401

[21] Appl. No.: 09/090,570

[22] Filed: Jun. 4, 1998

[51] Int. Cl.[6] .................................................. B66F 9/12
[52] U.S. Cl. ........................ 414/24.5; 414/685; 414/704; 414/721; 414/912; 414/920
[58] Field of Search .................................. 414/24.5, 685, 414/704, 721, 912, 920; 294/120

[56] References Cited

U.S. PATENT DOCUMENTS

| | | | |
|---|---|---|---|
| 2,858,035 | 10/1958 | Mettetal, Jr. ............................. | 414/704 |
| 3,033,395 | 5/1962 | Lowery .................................... | 414/685 |
| 3,934,726 | 1/1976 | Martin ..................................... | 414/24.5 |
| 3,985,246 | 10/1976 | Seymour ................................. | 414/24.5 |
| 4,073,532 | 2/1978 | Blair ........................................ | 294/120 |
| 4,257,725 | 3/1981 | Zieschang ............................... | 414/723 |
| 4,259,035 | 3/1981 | De Coene et al. ...................... | 414/111 |
| 4,722,651 | 2/1988 | Antal ...................................... | 414/24.5 |
| 5,476,356 | 12/1995 | Weiss ..................................... | 414/24.5 |
| 5,584,636 | 12/1996 | Ramsey .................................. | 414/24.5 |
| 5,807,053 | 9/1998 | Pride ...................................... | 414/24.5 |

*Primary Examiner*—Christopher P. Ellis
*Assistant Examiner*—Douglas Hess

[57] ABSTRACT

A hay loader is provided including a fixed frame mounted on a vehicle. Also included is a moving frame slidably mounted on the fixed frame. The moving frame is maintained vertically oriented while being shifted toward and away from the moving frame. Also included is at least one hydraulic cylinder connected between the fixed frame and the moving frame for selectively shifting the moving frame with respect to the fixed frame.

10 Claims, 3 Drawing Sheets

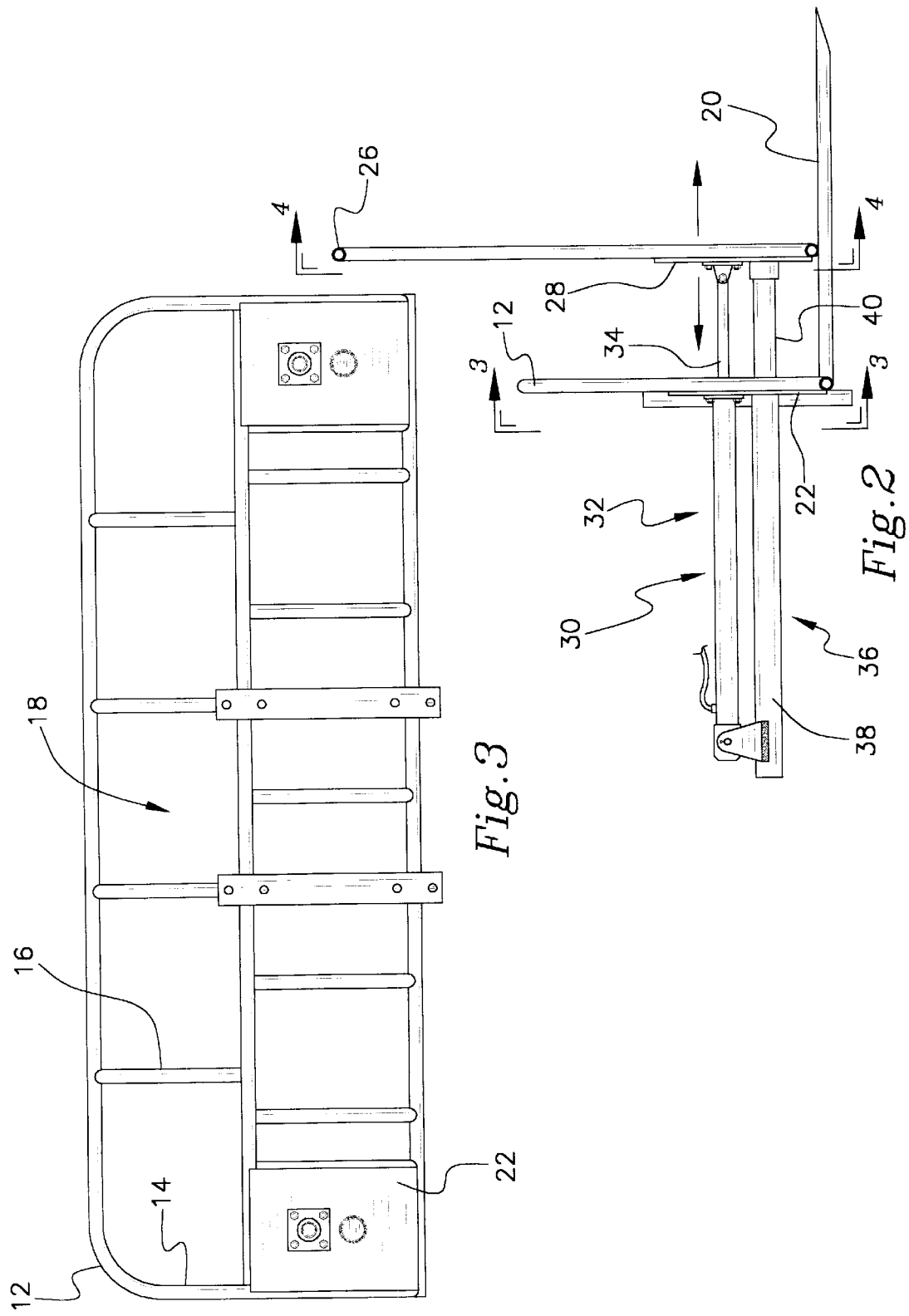

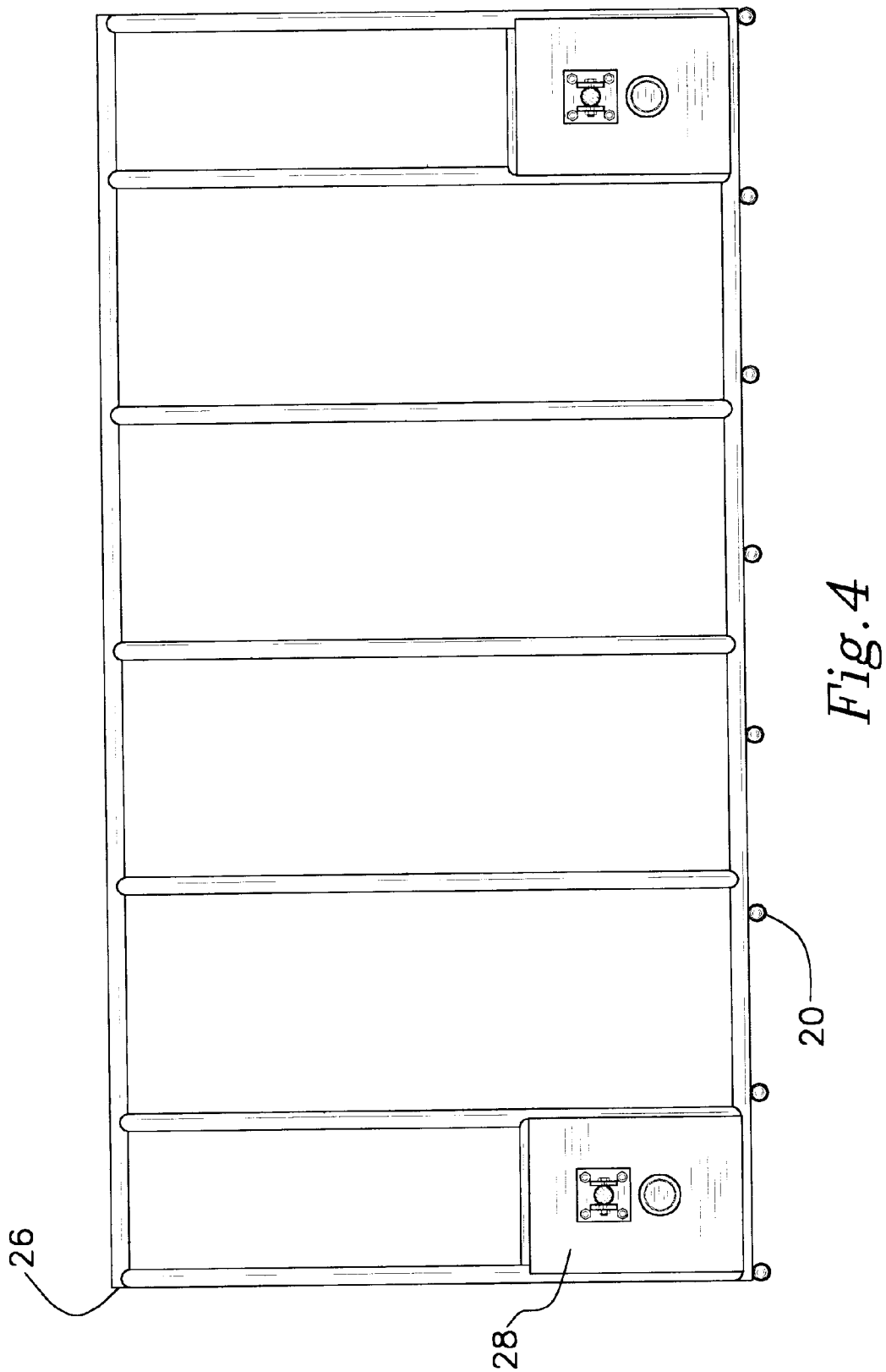

HAY LOADER

BACKGROUND OF THE INVENTION

1. Field of the Invention

The present invention relates to hay loaders and more particularly pertains to a new hay loader for conveniently loading, transporting and unloading a bale of hay.

2. Description of the Prior Art

The use of hay loaders is known in the prior art. More specifically, hay loaders heretofore devised and utilized are known to consist basically of familiar, expected and obvious structural configurations, notwithstanding the myriad of designs encompassed by the crowded prior art which have been developed for the fulfillment of countless objectives and requirements.

Known prior art hay loaders include U.S. Pat. No. 5,476,356; U.S. Pat. No. 4,259,035; U.S. Pat. No. 3,985,246; U.S. Pat. No. 4,257,725; U.S. Pat. No. 3,033,395; and U.S. Pat. No. 2,858,035.

In these respects, the hay loader according to the present invention substantially departs from the conventional concepts and designs of the prior art, and in so doing provides an apparatus primarily developed for the purpose of conveniently loading, transporting and unloading a bale of hay.

SUMMARY OF THE INVENTION

In view of the foregoing disadvantages inherent in the known types of hay loaders now present in the prior art, the present invention provides a new hay loader construction wherein the same can be utilized for conveniently loading, transporting and unloading a bale of hay.

The general purpose of the present invention, which will be described subsequently in greater detail, is to provide a new hay loader apparatus and method which has many of the advantages of the hay loaders mentioned heretofore and many novel features that result in a new hay loader which is not anticipated, rendered obvious, suggested, or even implied by any of the prior art hay loaders, either alone or in any combination thereof.

To attain this, the present invention generally comprises a fixed frame having an elongated horizontally oriented top bar, a horizontally oriented bottom bar and a horizontally oriented intermediate bar. Each of such horizontally oriented bars are fixedly coupled in coplanar, parallel relationship via a pair of short vertically oriented side bars which are mounted to ends of the horizontally oriented bars. Working in conjunction with the side bars are a plurality of vertically oriented staggered bars mounted between the top bar and the intermediate bar and further between the intermediate bar and the bottom bar. Such staggered bars define a plurality of square sections, as shown in FIG. 3. The fixed frame further includes a plurality of teeth each having an inboard end coupled to the bottom bar and extending forwardly therefrom. Such teeth preferably reside in perpendicular relationship with the horizontally oriented bars and the vertically oriented bars. The fixed frame further includes a pair of planar square mounting plates mounted over a pair of the sections of the fixed frame adjacent to opposed side bars and the bottom bar. For mounting the fixed gate on a vehicle, a pair of vertical channel irons are mounted between a central extent of the intermediate bar and the bottom bar of the fixed frame. FIG. 4 shows a moving frame including an elongated horizontally oriented top bar and a horizontally oriented bottom bar fixedly coupled in coplanar relationship. This is accomplished via a plurality of vertically oriented bars which have a height about twice that of the fixed frame. The moving frame further includes a pair of planar square mounting plates mounted adjacent to side lower corners thereof. With reference now to FIGS. 1 & 2, a pair of guide assemblies each include a hollow guide tube coupled to the corresponding mounting plate of the fixed frame. Each hollow guide tube extends rearwardly from the fixed frame in perpendicular relationship therewith. Associated therewith is a guide rod coupled to the corresponding mounting plate of the moving frame. Each guide rod remains in sliding relationship with the associated guide tube of the fixed frame. As such, the moving frame slides along an upper surface of the teeth of the fixed frame in constant parallel relationship with the fixed frame. Finally, a pair of hydraulic assemblies each include a first member coupled to the corresponding mounting plate of the fixed frame. The first member of each hydraulic assembly extends rearwardly from the fixed frame in perpendicular relationship therewith. A second member is slidably extended from the associated first member and coupled to the corresponding mounting plate of the moving frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hay loader apparatus and method which has many of the advantages of the hay loaders mentioned heretofore and many novel features that result in a new hay loader which is not anticipated, rendered obvious, suggested, or even implied by any of the prior art hay loaders, either alone or in any combination thereof.

It is another object of the present invention to provide a new hay loader which may be easily and efficiently manufactured and marketed.

It is a further object of the present invention to provide a new hay loader which is of a durable and reliable construction.

An even further object of the present invention is to provide a new hay loader which is susceptible of a low cost of manufacture with regard to both materials and labor, and which accordingly is then susceptible of low prices of sale to the consuming public, thereby making such hay loader economically available to the buying public.

Still yet another object of the present invention is to provide a new hay loader which provides in the apparatuses and methods of the prior art some of the advantages thereof, while simultaneously overcoming some of the disadvantages normally associated therewith.

Still another object of the present invention is to provide a new hay loader for conveniently loading, transporting and unloading a bale of hay.

Even still another object of the present invention is to provide a new hay loader that includes a fixed frame mounted on a vehicle. Also included is a moving frame slidably mounted on the fixed frame. The moving frame is maintained vertically oriented while being shifted toward and away from the moving frame. Also included is at least one hydraulic cylinder connected between the fixed frame and the moving frame for selectively shifting the moving frame with respect to the fixed frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention.

FIG. 3 is an illustration of the fixed frame of the present invention.

FIG. 4 is an illustration of the moving frame of the present invention.

DESCRIPTION OF THE PREFERRED EMBODIMENT

Figure 1:
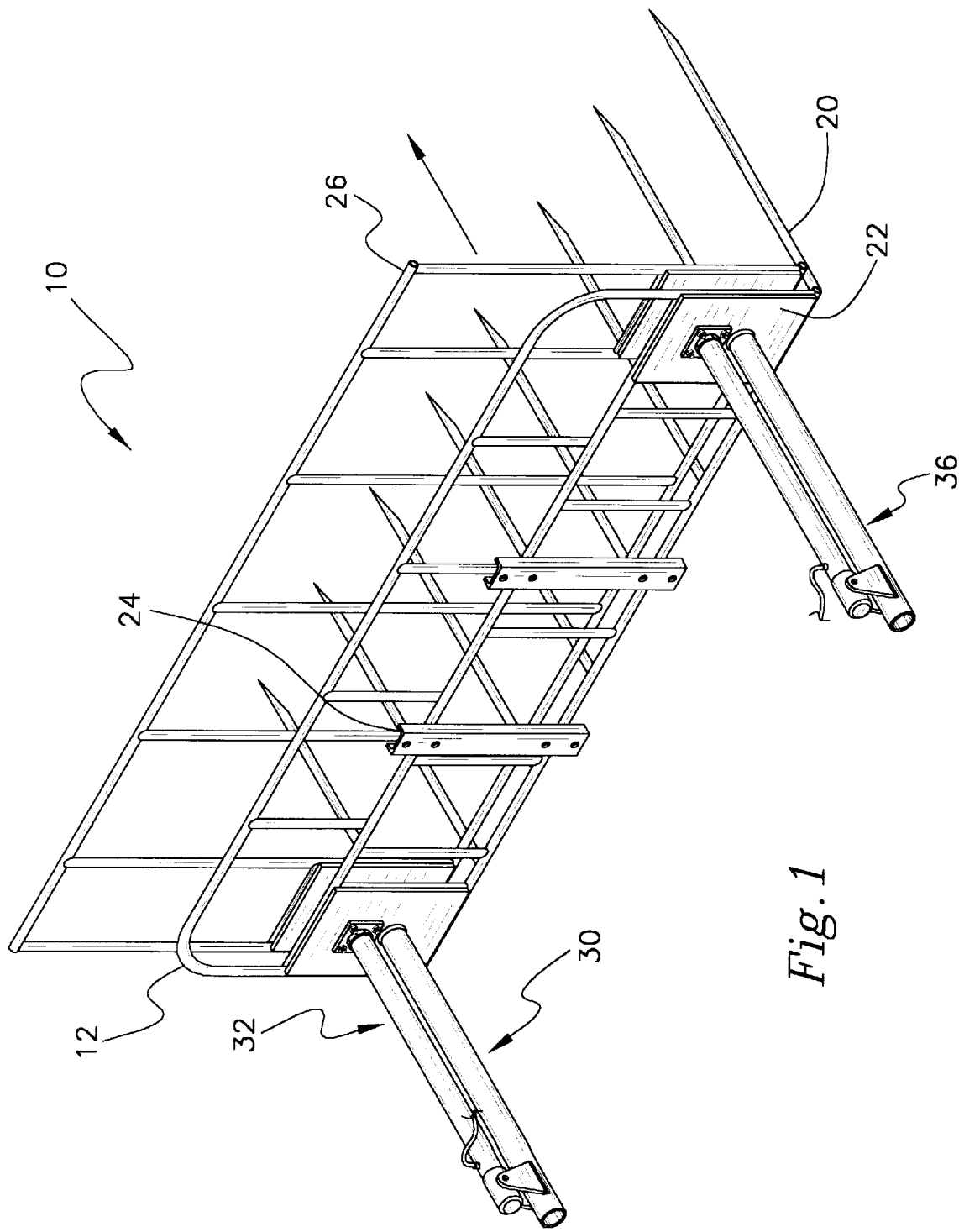
FIG. 1 is a perspective view of a new hay loader according to the present invention.

With reference now to the drawings, and in particular to FIGS. 1 through 4 thereof, a new hay loader embodying the principles and concepts of the present invention and generally designated by the reference numeral 10 will be described.

The present invention, designated as numeral 10, includes a rectangular fixed frame 12 having an elongated horizontally oriented top bar, a horizontally oriented bottom bar and a horizontally oriented intermediate bar. Each of such horizontally oriented bars are fixedly coupled in coplanar, parallel relationship via a pair of short vertically oriented side bars 14 which are mounted to ends of the horizontally oriented bars. Working in conjunction with the side bars are a plurality of vertically oriented staggered bars 16 mounted between the top bar and the intermediate bar and further between the intermediate bar and the bottom bar. Such staggered bars define a plurality of square sections 18, as shown in FIG. 3.

The fixed frame further includes a plurality of teeth 20 each having an inboard end coupled to the bottom bar and extending forwardly therefrom. Such teeth preferably reside in perpendicular relationship with the horizontally oriented bars and the vertically oriented bars. Further, each tooth ideally has a sharpened end.

The fixed frame further includes a pair of planar square mounting plates 22 mounted over a pair of the sections of the fixed frame adjacent to opposed side bars and the bottom bar. For mounting the fixed gate on a vehicle or tractor, a pair of vertical channel irons 24 are mounted between a central extent of the intermediate bar and the bottom bar of the fixed frame.

FIG. 4 shows a rectangular moving frame 26 including an elongated horizontally oriented top bar and a horizontally oriented bottom bar fixedly coupled in coplanar relationship. This is accomplished via a plurality of vertically oriented bars which have a height about twice that of the fixed frame. The moving frame further includes a pair of planar square mounting plates 28 mounted adjacent to lower side corners thereof.

With reference now to FIGS. 1 & 2, a pair of guide assemblies 30 each include a hollow guide tube 32 coupled to the corresponding mounting plate of the fixed frame. Each hollow guide tube extends rearwardly from the fixed frame in perpendicular relationship therewith. Associated with the guide tube is a guide rod 34 coupled to the corresponding mounting plate of the moving frame. Each guide rod remains in sliding relationship with the associated guide tube of the fixed frame. As such, the moving frame slides along an upper surface of the teeth of the fixed frame in constant parallel relationship with the fixed frame.

Finally, a pair of hydraulic assemblies 36 each include a first member 38 coupled to the corresponding mounting plate of the fixed frame. The first member of each hydraulic assembly extends rearwardly from the fixed frame in perpendicular relationship therewith. A second member 40 is slidably extended from the associated first member and coupled to the corresponding mounting plate of the moving frame. By this structure, the moving frame is selectively moved forwardly to dislodge a bale of hay situated on the teeth of the fixed frame. As shown in FIG. 2, the first member of each hydraulic assembly and the guide tube of each guide assembly have an equal length and are coupled at rear ends thereof.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hay loader comprising, in combination:

a fixed frame including an elongated horizontally oriented top bar, a horizontally oriented bottom bar and a horizontally oriented intermediate bar, each bar being fixedly coupled in coplanar, parallel relationship via a pair of short vertically oriented side bars which are mounted to ends of the horizontally oriented bars and a plurality of vertically oriented staggered bars mounted between the top bar and the intermediate bar and further between the intermediate bar and the bottom bar thereby defining a plurality of square sections, the fixed frame further including a plurality of teeth, each of the teeth having an inboard end coupled to the bottom bar and extending forwardly therefrom in perpendicular relationship with the horizontally oriented bars and the vertically oriented bars, the fixed frame further including a pair of planar square mounting plates mounted over a pair of the sections of the fixed frame adjacent to opposed side bars and the bottom bar, wherein a pair of vertical channel irons are mounted between a central extent of the intermediate bar and the bottom bar of the fixed frame, the channel irons being adapted for mounting on a vehicle;

a moving frame including an elongated horizontally oriented top bar and a horizontally oriented bottom bar fixedly coupled in coplanar relationship via a plurality of vertically oriented bars which have a height about twice that of the fixed frame, the moving frame further including a pair of planar square mounting plates mounted adjacent to side lower corners thereof;

a pair of guide assemblies each including a hollow guide tube coupled to a corresponding mounting plate of the fixed frame and extending rearwardly therefrom in perpendicular relationship therewith, a guide rod coupled to a corresponding mounting plate of the moving frame and extending rearwardly therefrom in sliding relationship with the associated guide tube of the fixed frame such that the moving frame slides along an upper surface of the teeth of the fixed frame in constant parallel relationship with the fixed frame; and a pair of hydraulic assemblies each including a first member coupled to a corresponding mounting plate of the fixed frame and extending rearwardly therefrom in perpendicular relationship therewith and a second member slidably extending through a bore formed in the a corresponding mounting plate of the fixed frame and coupled to a corresponding mounting plate of the moving frame, wherein the moving frame is selectively moved forwardly to dislodge a bale of hay situated on the teeth of the fixed frame.

2. A hay loader comprising:

a fixed frame for mounting on a vehicle, the fixed frame having a plurality of elongate teeth extending in a forward direction from a bottom portion of the fixed frame;

a moving frame mounted on the fixed frame in a position forward of the fixed frame and above the plurality of elongate teeth, the moving frame being movably mounted on the fixed frame such that the moving frame moves in a direction parallel to the longitudinal axis of the elongate teeth for pushing objects resting on the teeth, the moving frame being adapted to be maintained in an orientation substantially parallel to the fixed frame while being moved toward and away from the fixed frame; and means connected between the fixed frame and the moving frame for selectively shifting the moving frame with respect to the fixed frame.

3. A hay loader as set forth in claim 2 wherein the plurality of teeth are mounted in a perpendicular orientation to the fixed frame.

4. A hay loader as set forth in claim 2 wherein the moving frame has a height twice that of the fixed frame.

5. A hay loader as set forth in claim 2 wherein the means for selectively shifting includes at least one hydraulic cylinder which remains in line with a direction of motion of the moving frame.

6. A hay loader as set forth in claim 2 wherein the means for selectively shifting includes at least one hydraulic cylinder which is mounted to the fixed frame and extended rearwardly therefrom.

7. A hay loader as set forth in claim 2 wherein the frames include gates, each gate having a pair of horizontally oriented bars interconnected via a plurality of vertically oriented bars.

8. A hay loader as set forth in claim 2 wherein the means for selectively shifting comprises a pair of spaced hydraulic cylinders.

9. A hay loader as set forth in claim 2 wherein a bottom portion of the moving frame slides along the plurality of teeth.

10. A hay loader as set forth in claim 2 wherein a bottom portion of the moving frame remains at a uniform distance from the plurality of teeth as the moving frame moves toward and away from the fixed frame.

* * * * *